June 4, 1968  R. J. VON BOSE  3,386,170
INERTIAL REFERENCE DEVICE
Filed March 30, 1964  2 Sheets-Sheet 1

ROBERT J. VON BOSE
INVENTOR.

BY Glenn H. Antrim
AGENT

June 4, 1968    R. J. VON BOSE    3,386,170
INERTIAL REFERENCE DEVICE
Filed March 30, 1964    2 Sheets-Sheet 2

ROBERT J. VON BOSE
INVENTOR.

BY Glenn H. Antrim
AGENT

United States Patent Office 3,386,170
Patented June 4, 1968

3,386,170
INERTIAL REFERENCE DEVICE
Robert J. von Bose, Arlington, Tex., assignor to Ling-Temco-Vought, Inc., Dallas, Tex., a corporation of Delaware
Filed Mar. 30, 1964, Ser. No. 355,850
6 Claims. (Cl. 33—1)

ABSTRACT OF THE DISCLOSURE

An inertial reference device operable when a spherical reference element is static or is moving within a spherical cavity of a mounting structure, the outer surface of the reference element having distinctive areas with appropriate properties for reflecting polarized light from the surface, the planes of polarization of said reflected light being aligned with one or more reference points on the reference element, and further including a plurality of sensors on the mounting structure, each having a polarized analyzer, a photocell, and a Faraday light rotation cell for providing an indication of the orientation of the reflected polarized light with respect to the polarized analyzers, and further including a plurality of areas with distinctive reflecting properties that permit identification of a reference point which is located by virtue of the polarizing areas of the reference element, and a computer means for determining by spherical triangulation the exact location of the reference element with respect to the mounting structure.

---

This invention pertains to inertial sensing devices or to angle and position measurement devices and more particularly to sensors that employ the Faraday principle of rotation of light to aid in the computation of exact orientations of inertial reference elements.

Inertial directional devices that consist of a buoyant sphere within a cavity of an outer mounting have been utilized to replace the common gyroscope as a directional reference. Since reference elements of the buoyant type do not utilize mechanical connections to the outer mounting, orientation sensing devices that are not mechanically driven and that do not exert any rotational forces on the buoyant elements are required to compute the orientation of the reference elements.

To satisfy this need, the invention disclosed herein, which requires no moving parts in its operation, is a significant departure from previously known inertial reference devices. While a device constructed in accordance with this invention is versatile enough to function during periods of relative movement between a reference element and its mounting structure, it is unique in that it provides the same accurate information during static conditions.

This invention utilizes a spherical reference element having placed upon its surface an optical grating for reflecting polarized light, and sensing elements that include Faraday light rotation elements and polarized analyzers. The surface of a spherical reference element has a pattern of distinctive polarizing reflective areas and has interposed a plurality of other reflective areas that provide different degrees of reflection for differentiating between themselves as well as between the polarizing reflective areas. The various polarizing reflective areas have distinctive planes of polarization for various points of the surface corresponding to the linear direction from any given point to a reference point or points such as a pair of diametrically opposed poles. The direction referred to is actually the direction of a tangent to a great circle that is common to the given point and, for example, a respective pair of locational poles. When directions from two different points for locating the same poles are obtained, two angles can be readily calculated, with each angle being the angle included between a base line, viz., the great circle that passes through both points, and the respective great circle that passes through a point and the pole. The location of the pole with respect to the two points can then be computed by spherical triangulation.

In addition to the means for precisely locating poles by triangulation, means are provided for determining the general orientation of the reference element so that each located pole is identified, said means employing a measurement of the intensity of light reflected from the interposed reflective areas. When information for the identity of the poles and for their exact location is combined in a computer, an output from a computer can be obtained for the exact orientation of the reference element with respect to the mounting structure.

An object of this invention is to measure the orientation of a spherical surface by measurement of the planes of polarization of light that are reflected from the surface.

Another object is to utilize the Faraday principle of light rotation to facilitate very rapid measurements of angles on a polarizing surface.

Still another object is to provide information by reflected light from different polarizing reflective areas corresponding to different poles and from other reflective areas that identify poles as required for determining unambiguously the orientation of an inertial element.

Other objects and advantages will be apparent from the specification and claims and from the accompanying drawing illustrative of the invention.

Figure 5:
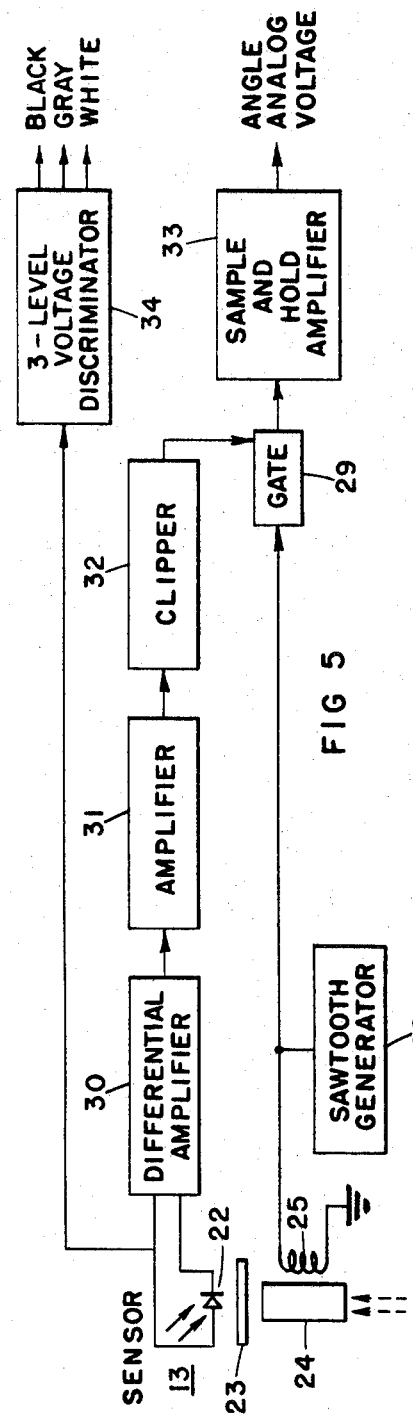
Figure 6:
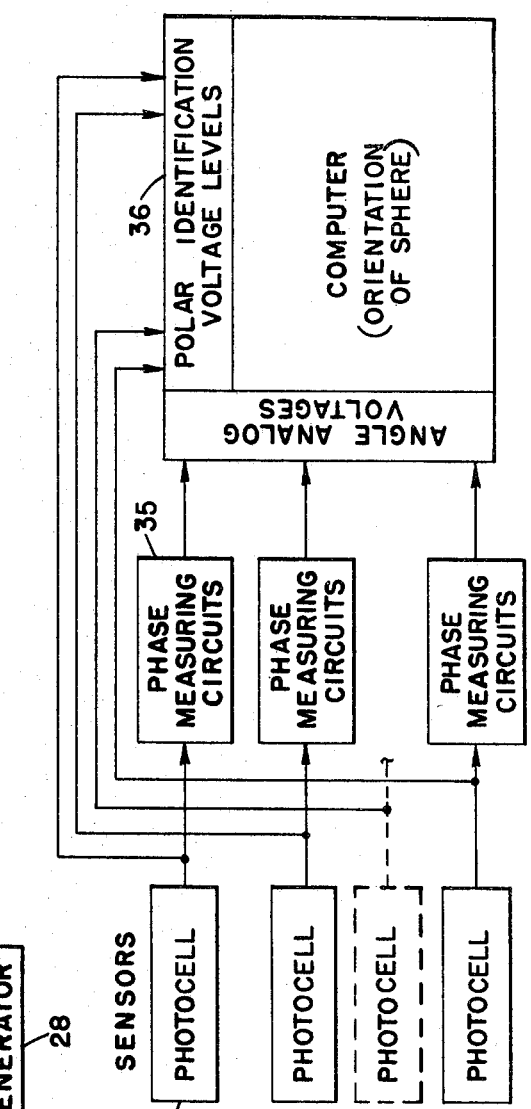

FIG. 5 is a block diagram of a circuit connected to a photocell and a Faraday element of a sensor to provide outputs according to light intensity and according to the planes of polarization of light reflected from the surface of the reference element; and FIG. 6 is a skeleton block diagram showing the application of the outputs for both light intensities and orientation of the planes of polarization to computer circuits.

Figure 1:
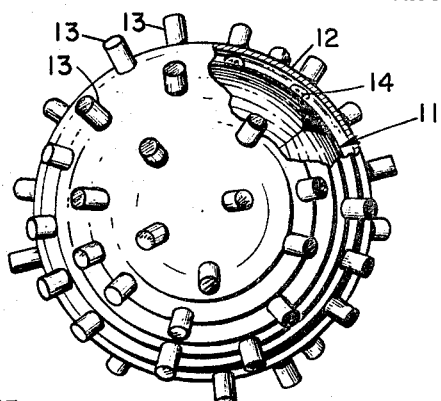
FIG. 1 is a perspective view of a spherical inertial device with a portion of its mounting structure cut away to show its inner spherical reference element.

In FIG. 1, an inner spherical reference element 11 is buoyantly supported within the spherical cavity of a mounting structure 12. Either fluid or sonic means (not shown) is utilized to maintain the inner spherical reference element 11 substantially centrally located within the cavity of the structure 12. The inertial element 11 is almost completely free of rotational forces as a result of changes in the positioning of the mounting structure 12. A plurality of sensors 13 are mounted on the mounting structure 12 in an arrangement according to the pattern of reflective areas on the spherical reference element 11 as described below. Each of the sensors 13 have openings 14 facing the inner inertial reference element 11 to receive light reflected from an immediate area or spot of the surface of the element 11.

Figure 2:
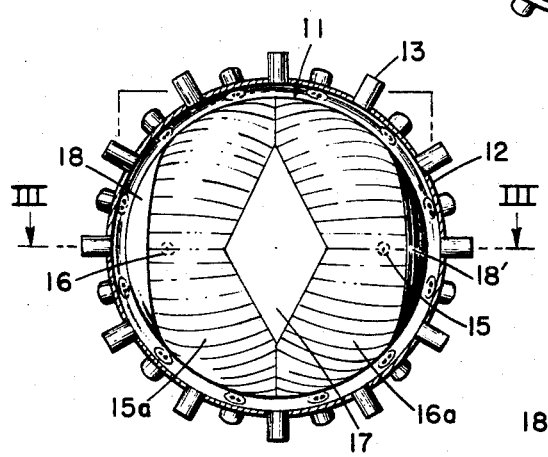
FIGS. 2 and 3 show respectively a view in the plane of orthogonal reference poles and a view perpendicular thereto of the pattern of polarizing areas on the surface of an inner spherical reference element as related to sections of the mounting structure.
Figure 3:
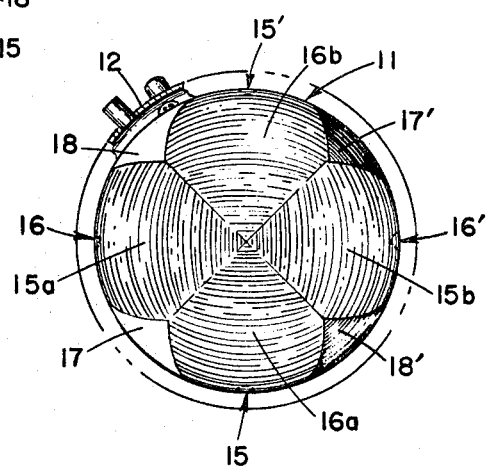

A pattern of polarizing reflective areas and other interposed reflective areas on the outer surface of the spherical polarizing element 11 is shown in FIGS. 2 and 3. This pattern is merely an example of the different patterns that will provide required information for computing orientation. That is, as will later be made clear, any arrangement of great circle segments sufficient is distribution and extent to locate one or more reference points, e.g., diametrically opposed poles, may be employed. The illustrated pattern is basically derived for locating four reference points or poles 15, 15', 16, and 16' that are located at respective ends of orthogonal axes. In the example shown, the surface of the spherical reference element 11 is divided into quadrants that have common points on the axis that is perpendicular to the orthogonal axes that are terminated by the poles 15, 15', 16, and 16'. Much of the surface of the reference element is characterized by the polarizing reflective areas; smaller reflective areas that have varying degrees of reflection are interposed between the polarizing areas, and for convenience herein are sometimes referred to merely as the interposed areas.

The polarizing reflective area in each quadrant is characterized by a plurality of planes of polarization varying with location such that, at any point, a plane is oriented such that it contains the poles that are located in adjacent quadrants. The polarizing areas 15a and 15b that are located in opposite quadrants are oriented for locating poles 15 and 15' in the other quadrants. Likewise, areas 16a and 16b locate poles 16 and 16'. Once a pole is physically located, all that remains is to identify it conclusively. This is made possible by examining the reflectivity of the interposed reflective areas. For example, a pole which is located between dark area 17' and gray area 18' can only be pole 16'.

The spherical inertial element 11 may, for example be an anodized aluminum sphere with an optical grating engraved upon its surface in directions according to the great circles of the pairs of poles 15, 15' and 16, 16'. With such a construction, a suitable clear plastic coating is placed upon the reference element 11 after the polarizing areas are engraved and after the reflective areas 17, 17', 18, and 18' are finished according to desired degrees of reflection.

Figure 4:
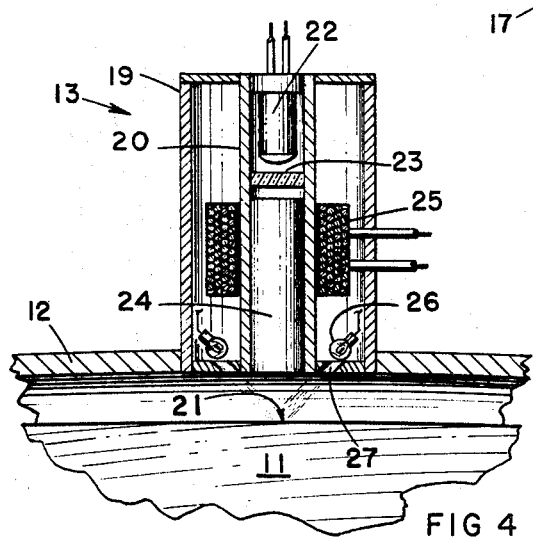
FIG. 4 is a cross-sectional view of one of the sensors that are mounted on the outer surface of the mounting structure.

The components of a typical sensor 13 are shown in the cross-sectional view of FIG. 4. An outer housing 19 has one end mounted to the outer spherical structure 12. An opaque, non-magnetic light tube 20 is mounted within the housing 19. The end of the light tube adjacent to the surface of the reference element 11 is open or transparent to light that is reflected from a small area or point 21 of the surface of the reference element 11. A light sensing element, for example, a photo-cell 22, is mounted in the opposite end of the tube 20 to receive light that is reflected from the surface of the reference element 11 and passed through a polarized analyzer 23. The polarized analyzer 23 is mounted across the light tube 20 adjacent the photocell 22. A transparent plastic cylinder 24 containing ferromagnetic material, is interposed in the light tube 20 between the surface area 21 and the polarized analyzer 23. This cylinder 24, when placed in a magnetic field such that lines of force are longitudinal through the cylinder, provides rotation of the plane of polarization of light according to the Faraday principle. To conveniently achieve the desired magnetic field, a magnetic winding 25 is mounted coaxially about the light tube 20 and the Faraday cylinder 24 to cause rotation of the plane of polarization of light in an amount proportional to the current flow in the winding 25. One or more sources of light 26 are positioned in the end of the sensor 19 to illuminate that small spot or immediate area 21 of the reference element 11 that is then positioned in the field of view of the light tube 20.

The Faraday light rotation cylinder 24 is preferably fabricated from europium orthosilicate, $Eu_2SiO_4$, that has a Verdet constant with red or yellow light of 2.5 minutes per oersted per centimeter. Since a 90 degree rotation as provided by a change in angle from +45 degrees to −45 degrees is sufficient for determining the direction of a great circle at any point on the surface of the reference element 11, a 2-centimeter length of rod will provide the necessary maximum rotation in response to a field intensity of 540 oersteds as supplied by the magnetic winding 25.

In FIG. 5 is shown a preferred circuit for converting the orientation of the plane of polarization of the light that is reflected from the surface of the reference element 11 into voltages that are a function of the direction of the reference element great circles with respect to mounting structure 12; also provided is means for converting different light intensities corresponding to interposed areas 17, 17', 18, 18' into voltages of different discrete steps when a sensor is positioned over these interposed areas. The output of a sawtooth generator 28 is connected to the magnetic winding 25 of the Faraday light rotational device and is also connected to an input of a gate 29. The photocell 22 is connected to an input of a differential amplifier 30. The sawtooth wave that is applied from the photocell 22 is converted to series of pulses at the output of the amplifier 30 as the waveform changes abruptly during each of the periods of the sawtooth generator 28. The output of the differential amplifier 30 is connected to the input of an amplifier 31 to achieve a desired signal level, and the output of the amplifier 31 is connected to the input of a clipper 32 that provides as an output uniform sharp rectangular pulses for precisely designating the starting times of the sawtooth waveform that is derived from the photocell 22. The output of the clipper 32 is connected to the control circuit of the gate 29. The output of the gate 29 is connected to the input of a sample and hold amplifier 33. When the gate 29 is momentarily opened by the application of a pulse from the clipper 32, a pulse is applied from the sawtooth generator 28 through gate 29 to the input of the sample and hold amplifier 33. Consequently, the output voltage of sample and hold amplifier 33 becomes an analog of the angle between the plane of polarization produced by reflection from area 21 and a polarized analyzer 23. The output of the photocell 22 is also connected to the input of a three-level voltage discriminator 34 which develops discrete levels of output voltage for the different intensities of light that are reflected from black, gray, or white surfaces corresponding to interposed areas 17, 17', 18, 18'.

To illustrate the derivation of the angle analog, let it be assumed that the area 21 of the reference element 11 from which polarized light is reflected into the sensor 13 of FIG. 5 is oriented such that the plane of polarization of the reflected light must be rotated 15 degrees by the Faraday light rotation element 24 to be aligned with the plane of polarization of the analyzer 23, so that maximum intensity of light is transmitted from the surface 21 to the photocell 22. The output pulse of the clipper 32 occurs when the output voltage of the sawtooth generator 28 is sufficient to energize the winding 25 to the extent necessary to cause 15 degrees rotation of the reflected light. Since the polarization of the reflected light is directly correlated to the attitude of the reference element 11, and since the Faraday light rotation element 24 has been calibrated as to the required voltages for producing different angles of rotation, the amplitude of the pulse of voltage that is applied by operation of the gate 29 from the sawtooth generator 28 to the amplifier 33 for rotation of 15 degrees indicates the direction of the plane or polarization of the reflected light from the surface 21. This direction is the direction of a pole from the specific area 21. The amplifier 33 stores the voltage for an interval required for sampling by a computer.

In FIG. 6, each photocell 22 is shown connected through separate phase-measuring circuits 35, such as those shown in FIG. 5, to inputs of an analog computer 36. The photocells 22 may be connected through a sequence switch to a single phase-measuring circuit so that outputs for each sensor 13 may be applied in rapid succession to the inputs of the computer 36. The computer 36 is programmed to accept the angle analog voltages from the phase-measuring circuits and, by spherical triangulation, to determine the locations of the poles of the reference element 11 relative to the mounting structure 12. The measurements from a plurality of pairs of sensors 13 may be averaged to provide results of any desired degree of accuracy. The poles are identified by determining their approximate orientation from the application of polar identification voltage levels as applied from three-level voltage discriminators 34.

The pattern of the reflective areas on the surface of the reference element 11 as shown in the accompanying drawing is merely suggestive of one of a variety of patterns that may be used. The number of sensors 13 may be reduced or increased according to the degree of accuracy that is required. When the pattern of polarizing areas encompasses substantially all of the reference sphere 11, the sensors 13 may be necessary in only a small portion of the outer spherical structure 12.

The sawtooth generator 28 of FIG. 5 can be replaced with, for example, a sine-wave generator for applying a sinusoidal voltage to the magnetic winding 25. When a sine-wave generator is used, the output of the photocell 22 is applied through an amplifier to an input of a phase comparator. The output of the sine-wave generator is also applied to an input of the phase comparator to provide at its output a voltage having a value proportional to the angle of light rotation of the Faraday element 24 that is required to align reflected light with the plane of polarization of the analyzer 23.

While only one embodiment of the invention has been described in detail herein and shown in the accompanying drawing, it will be evident that various further modifications are possible in the arrangement and construction of its components without departing from the scope of the invention.

I claim:

1. An inertial sensing device, comprising:
   an outer mounting structure;
   an inner spherical reference element having at least two pairs of diametrically opposed poles, said reference element being surrounded by said outer mounting structure and suspended so that it has its outer surface maintained in proximate relation to said mounting structure but having freedom of movement so that it may be oriented in various initially unknown positions relative to said mounting structure, said outer surface having light polarizing characteristics that provide through light reflection a plurality of planes of polarization of light with each of said planes respectively including great circles passing through at least one of said poles;
   a plurality of photoelectric cells disposed on said mounting structure, each of which is aligned to receive reflected light from a different small area of said proximate polarizing surface, said small areas lying on different great circles passing through the same pole;
   means for illuminating said small surface areas to provide reflected light for said photoelectric cells;
   a plurality of polarizing analyzers consisting of one for each of said photoelectric cells, each of said analyzers being respectively interposed between a photoelectric cell and an illuminated small area and further being fixed with respect to the mounting structure;
   electromagnetic means associated with each photoelectric cell for aligning the plane of polarization of light received from the polarizing surface with the plane of polarization of each respective analyzer;
   first electronic means for measuring for each of said photoelectric cells a respective angle between the initial plane of polarization of reflected light from a small area and a known direction relative to said mounting structure; and
   second electronic means for translating at least two of said measured angles into respective linear directions and for determining the location of at least one of the poles of said reference element relative to said mounting structure.

2. An inertial sensing device, comprising:
   an outer mounting structure;
   an inner spherical reference element having at least two pairs of diametrically opposed poles, said reference element being surrounded by said outer mounting structure and suspended so that it has its outer surface maintained in proximate relation to said mounting structure but having freedom of movement so that said outer surface may be oriented in various initially unknown positions relative to said mounting structure, said outer surface having light polarizing characteristics that provide through light reflection a plurality of planes of polarization of light with each of said planes including great circles passing through at least one of said poles;
   a plurality of light sensors disposed on said mounting structure, each of which is aligned to receive light from a different small area of said outer polarizing surface, said small areas lying on different great circles passing through a respective pole, and each of said light sensors having a photoelectric cell and a polarizing analyzer oriented in a known position with respect to the mounting structure and interposed between the photoelectric cell and the reference element;
   means for illuminating said small surface areas to provide reflected light for said light sensors;
   a plurality of transparent Faraday light rotation elements, each being associated with a respective one of said light sensors;
   means for varying the current in each of said Faraday elements for periodically rotating the plane of polarization of reflected light received by said light sensors;
   first electronic means for determining the angle of rotation required to align the initial plane of polarization of said reflected light with the plane of polarization of said analyzer, said determination being effected by detecting the current in a Faraday element which produces the required rotation; and
   second electronic means for converting the required angle of rotation of said light into a linear direction of orientation relative to said mounting structure of pole associated with said illuminated polarizing surface.

3. An inertial sensing device, comprising:
   an outer mounting structure;
   an inner spherical reference element having at least one reference point on its outer surface, said reference element being suspended so that it has its outer surface maintained in proximate relation to said mounting structure but having freedom of movement so that said outer surface may be oriented in various initially unknown positions relative to said mounting structure, said outer surface having light polarizing characteristics such that the plane of polarization of light reflected from any random point of said surface is a direct function of the linear direction from the respective random point to a reference point of said surface;
   a plurality of light sensors mounted on said mounting structure, each of said sensors being aligned to receive reflected light from a random small area of said polarizing surface that is then positioned adjacent a respective sensor, and each of said light sensors having a photoelectric cell and a polarizing analyzer, said analyzer having a known orientation and being interposed between the photoelectric cell and the reference element;
   means for illuminating each of said small surface areas being inspected;
   means associated with each of said sensors for rotating the plane of polarization of light reflected from the polarizing surface and initially received by a sensor into alignment with the plane of polarization of a respective analyzer;

electronic means connected to each of said means for rotating the plane of polarization of reflected light and connected to the respectively associated photoelectric cells, for measuring the rotation effected by said means for rotating the plane of polarization of reflected light, and for relating the output of an associated photoelectric cell to the measured rotation such that the orientation of the reflected light initially received is determined with respect to the mounting structure, whereby the orientation of the corresponding reference point is determined with respect to the mounting structure; and computer means connected with said electronic means for determining the position of said reference point with respect to the mounting structure by spherical triangulation.

4. An inertial sensing device, comprising:

an outer mounting structure;

an inner spherical reference element being suspended so that it has an outer surface that is maintained in proximate relation to said mounting structure but having freedom of movement so that said outer surface may be oriented in various initially unknown positions relative to said mounting structure, said reference element having on its outer surface a pattern that comprises a plurality of distinctive polarizing areas and interposed areas, said interposed areas having different properties of reflectivity to distinguish them from each other and from said polarizing areas, each of said polarizing areas providing a plurality of planes of polarization of reflected light, each plane including a great circle which passes through at least one of a plurality of reference points on the surface of said reference element;

a plurality of light sensors mounted on said mounting structure and aligned to receive reflected light from the small immediate area of the surface of said reference element that is then positioned adjacent to a respective sensor, said light sensors being arranged so that each of said polarizing areas corresponding to a particular one of said reference points is always reflecting light to at least two of said sensors and each of said interposed areas is reflecting light to at least one sensor other than the above two sensors, and each of said sensors having a photoelectric cell;

a plurality of polarizing analyzers consisting of one for each of said photoelectric cells, each of said analyzers being respectively interposed between a photoelectric cell and an illuminated small area and further being fixed with respect to the mounting structure;

means for illuminating said small immediate areas;

electromagnetic means associated with each of said sensors for rotating the plane of polarization of light initially received by a respective sensor into alignment with the plane of polarization of a respective analyzer;

first electronic means for measuring by detecting the current in each electromagnetic means which produces the angular rotation required to achieve alignment between the initial plane of polarization of reflected light and the plane of polarization of a respective analyzer, and to determine by adding said required angular rotation to the known angle of the analyzer the direction from a respective sensor to that reference point corresponding to the immediate area being examined;

second electronic means for converting intersecting directions from at least two sensors to the same reference point into a location of said reference point;

third electronic means at each of said sensors for deriving an output as the function of the degree of reflection from said interposed areas; and means for computing the general orientation of said reference element from said output for determining which reference point is being located by certain ones of said sensors, such that the unambiguous computation of orientation of said reference element is achieved.

5. An inertial sensing device comprising:

a mounting structure having an inner spherical cavity;

a spherical reference element suspended for universal movement within said cavity, said reference element having on its outer surface a pattern that comprises at least two distinctive polarizing reflective areas and at least two interposed areas that have different degrees of reflection that distinguish the interposed areas from each other and from said polarizing areas, each of said polarizing reflective areas providing a plurality of planes of polarization of reflected light each of said planes including a great circle passing through a pair of reference poles, said poles corresponding to points of said reference element at opposite ends of one of at least two orthogonal axes;

a plurality of light sensors attached to said mounting structure and arranged in a manner such that a plurality of said sensors are positioned over at least one of said polarizing reflective areas and such that at least two of said interposed areas are underneath two of said sensors, and such that all sensors do not fall on a single great circle of said reference element regardless of the orientation of said reference element within said cavity, each of said sensors having a photoelectric cell aligned to receive reflected light from the immediate area of said reference element that is then positioned beneath a respective sensor, and each of said sensors having a polarizing analyzer which is fixed with respect to the sensor and interposed between a respective photoelectric cell and the reference element;

means for illuminating each of said immediate areas;

electromagnetic means associated with each sensor for rotating the plane of polarization of light initially received by a respective sensor into alignment with the plane of polarization of a respective analyzer;

first electronic means associated with each of said sensors for measuring at each of said immediate areas the angle with respect to the analyzer of the plane of polarization of light reflected from the respective immediate area;

means for computing the location of a pole by spherical triangulation, said means utilizing at least two of the above measured angles;

second electronic means for measuring the intensity of light reflected from said interposed areas and incident on respective photoelectric cells; and third electronic means utilizing said measured light intensities for determining the identity of a pole located by spherical triangulation.

6. An intertial sensing device, comprising:

a mounting structure having an inner spherical cavity;

a spherical reference element suspended for universal movement within said cavity, said reference element having on its outer surface a pattern that comprises two alternate distinctive polarizing reflective areas and interposed areas that have different qualities of reflection that distinguish the interposed areas from said polarizing areas, each of said polarizing reflective areas providing a plurality of planes of polarization of reflected light, and having poles constituting points on the surface of said reference element at oppostie ends of orthogonal axes, the plane of polarization of reflected light from any point on said polarizing areas containing a segment of a great circle that passes through said point and a corresponding pair of diametrically opposed poles;
a plurality of sensors arranged on said mounting structure in a manner such that a plurality of sensors are positioned over each of said polarizing reflective areas regardless of the orientation of said reference element within said cavity and such that all sensors do not fall on a single great circle of said reference element, each of said sensors comprising a source of light for directing a spot of light onto the outer surface of said reference element, and a pick-up arrangement disposed over said illuminated spot for receiving reflected light from the surface of said reference element, said pick-up arrangement having a photocell, a cylinder of transparent ferromagnetic material with Faraday rotational characteristics and a fixed polarizing analyzer disposed in the light path between said illuminated spot and said photocell, the axis of said cylinder being aligned with said light path, and a magnetic winding disposed coaxially about said cylinder;
means for supplying a time-varying voltage to said magnetic winding to cause rotation of the plane of polarization of light in said light path;
means for deriving from a given one of said photocells a voltage having an amplitude which varies directly with changes in light intensity resulting from rotation by said ferromagnetic cylinder of the light reflected from one of said polarizing reflective areas;
means for measuring the phase difference between said time-varying voltage and said photocell output voltage to provide an angle analog voltage;
a voltage level discriminator connected to said photocell to provide different distinct levels of voltage for the different levels of reflection of light obtained from said illuminated areas of the outer surface of said reference element; and
computer means having inputs connected to said discriminator and to said phase measuring means to compute the orientation of said reference element in response to application of said angle analog voltage and said distinct levels of voltage.

References Cited

UNITED STATES PATENTS

| | | | |
|---|---|---|---|
| 3,270,567 | 9/1966 | Crampton | 74—5.6 |
| 3,306,159 | 2/1967 | Beall et al. | 88—14 |
| 3,313,161 | 4/1967 | Nordsieck | 74—5.6 |

OTHER REFERENCES

R. J. King et al.: Sensitive Method For the Measurement of Small Rotations, Jour. of Sci. Inst., vol. 36, December 1959, pp. 507–509.

JEWELL H. PEDERSEN, *Primary Examiner.*

A. A. KASHINSKI, *Assistant Examiner.*